(12) United States Patent
Osa et al.

(10) Patent No.: US 12,054,080 B2
(45) Date of Patent: Aug. 6, 2024

(54) VEHICLE SEAT FRAME AND VEHICLE SEAT

(71) Applicants: NHK SPRING CO., LTD., Yokohama (JP); SUBARU CORPORATION, Tokyo (JP)

(72) Inventors: Syunichirou Osa, Yokohama (JP); Hiroki Matsuda, Yokohama (JP); Jun Shirai, Yokohama (JP); Masafumi Takano, Tokyo (JP); Kenji Nagumo, Tokyo (JP); Fumito Kitanaka, Tokyo (JP); Suguru Ishikawa, Tokyo (JP); Naoki Hayashi, Fujisawa (JP)

(73) Assignees: NHK SPRING CO., LTD., Yokohama (JP); SUBARU CORPORATION, Tokyo (JP)

( * ) Notice: Subject to any disclaimer, the term of this patent is extended or adjusted under 35 U.S.C. 154(b) by 43 days.

(21) Appl. No.: 18/145,760

(22) Filed: Dec. 22, 2022

(65) Prior Publication Data

US 2023/0202360 A1    Jun. 29, 2023

(30) Foreign Application Priority Data

Dec. 27, 2021    (JP) ................................ 2021-213147

(51) Int. Cl.
*B60N 2/427*    (2006.01)
*B60N 2/42*    (2006.01)

(52) U.S. Cl.
CPC ........... *B60N 2/427* (2013.01); *B60N 2/4221* (2013.01)

(58) Field of Classification Search
CPC ......... B60N 2/4221; B60N 2/68; B60N 2/427
USPC ......................................... 297/216.1, 216.13
See application file for complete search history.

(56) References Cited

U.S. PATENT DOCUMENTS

| 4,636,002 | A | * | 1/1987 | Genjiro | .................... B60N 2/22 297/319 |
| 6,050,635 | A | * | 4/2000 | Pajon | ................... B60N 2/4221 297/483 |
| 2013/0193725 | A1 | * | 8/2013 | Morimoto | ............ B60N 2/4221 297/216.1 |
| 2013/0193737 | A1 | | 8/2013 | Morimoto | |

FOREIGN PATENT DOCUMENTS

JP           5799838 B2    10/2015

* cited by examiner

*Primary Examiner* — Anthony D Barfield
(74) *Attorney, Agent, or Firm* — Knobbe, Martens, Olson & Bear, LLP

(57) ABSTRACT

In a vehicle seat frame, a connection member that connects left and right links together in a seat left-right direction is disposed below a rear portion of a cushion pan included in a seat cushion frame. A sloped surface sloped with a downward gradient toward a seat rear side is formed at a lower surface of the rear portion of the cushion pan. The sloped surface of the cushion pan slides in a seat rearward and diagonally downward direction relative to the connection member when the cushion pan deforms in a seat downward direction under load from the occupant during a head-on collision of the vehicle.

5 Claims, 11 Drawing Sheets

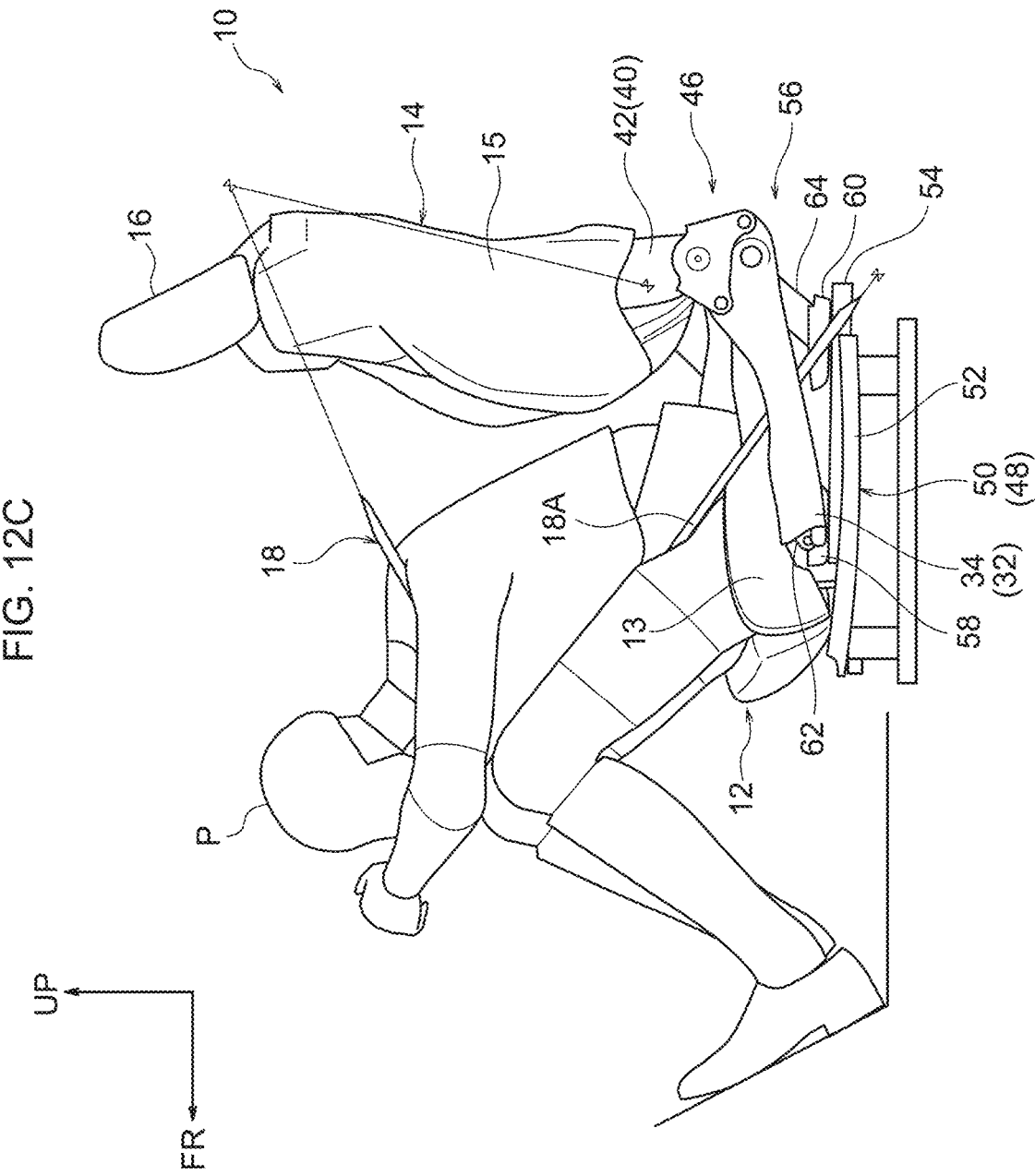

VEHICLE SEAT FRAME AND VEHICLE SEAT

CROSS-REFERENCE TO RELATED APPLICATION

This application is based on and claims priority under 35 USC 119 from Japanese Patent Application No. 2021-213147 filed on Dec. 27, 2021, the disclosure of which is incorporated by reference herein.

BACKGROUND

Technical Field

The present disclosure relates to a vehicle seat and a frame thereof.

Related Art

A vehicle seat cushion frame described in Japanese Patent No. 5799838 is formed with framework of a seat cushion configured by longitudinal frame bodies that are disposed at the seat left-right direction two sides of the framework and that are coupled together at front and rear sides thereof by respective lateral frame bodies. A space between front end portions of the two longitudinal frame bodies including the front side lateral frame body is covered from an upper side by a panel fixed to the two longitudinal frame bodies. The panel side of the front side lateral frame body is configured in a concave shape so enlarge a distance to the panel. This results in a configuration in which the panel is deformed greatly when the panel has received load from an occupant during a head-on collision of the vehicle, such that there is a large amount of energy absorbed by the seat front portion.

SUMMARY

In the above related art, the panel side of the front side lateral frame body is configured in a convex shape, and so there is a reduction in the strength of the front side lateral frame body. There is accordingly a possibility that the amount of deformation of the vehicle seat cushion frame overall becomes large due to the front side lateral frame body fold-bending on receipt of load from the occupant, and there is room for improvement from the perspective of preventing this from occurring.

In consideration of the above circumstances, an object of the present disclosure is to obtain a vehicle seat frame and vehicle seat capable of reducing the amount of deformation of a frame overall while still securing shock absorption ability during a head-on collision.

A vehicle seat frame of a first aspect of the present disclosure includes a seat cushion frame configuring a framework of a seat cushion for an occupant of a vehicle to sit on. The vehicle seat frame includes left and right side frames disposed at left and right side portions of the seat cushion, and a cushion pan connecting upper end portions of front portions of the left and right side frames together in a seat left-right direction, left and right slide rails disposed below the left and right side frames and attached to a floor section of the vehicle, left and right risers attached to the left and right slide rails, left and right links having respective one end portions connected to the front portions of the left and right side frames and respective other end portions connected to the left and right risers, and a connection member that connects the left and right links together in the seat left-right direction and that is disposed below a rear portion of the cushion pan. A sloped surface, which is sloped with a downward gradient toward a seat rear side, is formed at a lower surface of the rear portion of the cushion pan. The sloped surface slides in a seat rearward and diagonally downward direction relative to the connection member due to the cushion pan deforming in a seat downward direction under a load from the occupant during a head-on collision of the vehicle.

In the first aspect the vehicle seat frame includes the seat cushion frame, the left and right slide rails, the left and right risers, the left and right links, and the connection member. The seat cushion frame configures the framework of the seat cushion for an occupant of a vehicle to sit on, and includes the left and right side frames disposed at the left and right side portions of the seat cushion, and the cushion pan connecting the upper end portions of the front portions of the left and right side frames together in the seat left-right direction. The left and right slide rails are disposed below the left and right side frames and are attached to the floor section of the vehicle. The left and right risers are attached to the left and right slide rails. The respective one end portions of the left and right links are connected to the front portions of the left and right side frames, and the respective other end portions thereof are connected to the left and right risers. The connection member connects the left and right links together in the seat left-right direction, and is disposed below the rear portion of the cushion pan. The sloped surface sloped with a downward gradient toward the seat rear side is formed at the lower surface of the rear portion of the cushion pan.

The sloped surface slides in the seat rearward and diagonally downward direction relative to the connection member due to the cushion pan deforming in the seat downward direction under load from the occupant wearing the seatbelt during a head-on collision of a vehicle. The reaction force from the connection member imparted to the cushion pan is thereby suppressed from increasing and deformation of the cushion pan is also allowed, enabling a shock absorption ability to be secured. Moreover, there is no need to set a concave shape on such a connection member, enabling the connection member to be prevented from fold-bending on receipt of load from the occupant. As a result thereof the amount of deformation of the frame overall can be reduced.

The vehicle seat frame of a second aspect of the present disclosure is the first aspect, wherein the connection member is bent at left and right bent portions provided at seat left-right direction sides of the connection member, and a seat left-right direction center portion thereof slides along the sloped surface.

In the second aspect the amount of bend set at the left and right bent portions of the connection member is changed so as to be able to adjust the relative position of the center portion of the connection member with respect to the sloped surface of the cushion pan. This accordingly, for example, increases the degrees of freedom for placing the cushion pan and the connection member.

A vehicle seat frame of the third aspect of the present disclosure is the first aspect, wherein the sloped surface is straight as viewed along the seat left-right direction.

In the third aspect the sloped surface of the cushion pan is straight as viewed along the seat left-right direction, and so this enables the reaction force received from the connection member when the sloped surface slides along the connection member to be adjusted by changing the slope angle of the sloped surface.

A vehicle seat frame of a fourth aspect of the present disclosure is the first aspect wherein the sloped surface is curved as viewed along the seat left-right direction.

In the fourth aspect, the sloped surface of the cushion pan is curved as viewed along the seat left-right direction and so this enables the reaction force received from the connection member when the sloped surface slides along the connection member to be changed according to the relative position of the sloped surface with respect to the connection member.

A vehicle seat of a fifth aspect of the present disclosure includes a seat cushion for an occupant to sit on, a seatback configuring a backrest to support a back of the occupant, and a framework comprising the vehicle seat frame of the first aspect.

In the fifth aspect, the framework of the vehicle seat equipped with the seat cushion and the seatback is configured by the vehicle seat frame of the first aspect. Similar advantageous effect are according obtained to those of the first aspect.

As described above, the vehicle seat frame and the vehicle seat according to the present disclosure are able to reduce the amount of deformation of the frame overall while still securing a shock absorption ability during a head-on collision.

BRIEF DESCRIPTION OF THE DRAWINGS

Exemplary embodiments of the present disclosure will be described in detail based on the following figures, wherein:

FIG. 12C is a side view corresponding to FIG. 12A and FIG. 12B and illustrating a state at a later stage of a head-on collision.

DETAILED DESCRIPTION

Figure 1:
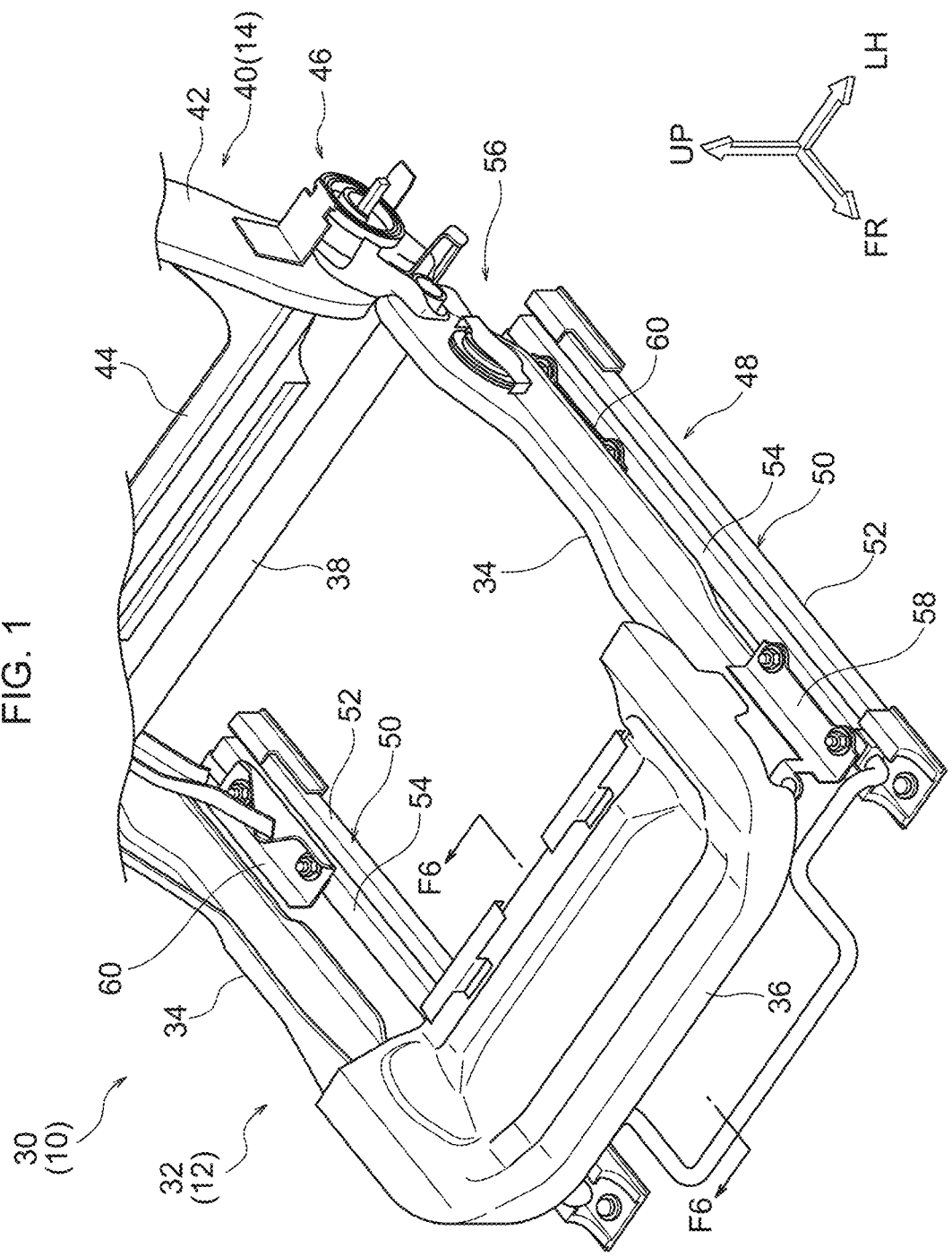
FIG. 1 is a perspective view illustrating a periphery of a seat cushion frame in a vehicle seat frame according to an exemplary embodiment, in a state viewed diagonal from a seat left-front side and above.

A vehicle seat 10 and a vehicle seat frame 30 according to an exemplary embodiment of the present disclosure will now be described, with reference to FIG. 1 to FIG. 12C. Note that some of the reference numerals are omitted in the drawings to make viewing the drawings clearer. Moreover as appropriate in the drawings, an arrow FR indicates a vehicle front direction, an arrow UP indicates a vehicle upward direction, an arrow LH indicates a vehicle left direction, and an arrow RH indicates a vehicle right direction. When front-rear, left-right, and up-down directions are used in the following explanation, unless particularly stated otherwise, these refer to front-rear in the vehicle front-rear direction, left-right in the vehicle left-right direction (vehicle width direction), and up-down in the vehicle up-down direction.

Figure 12A:
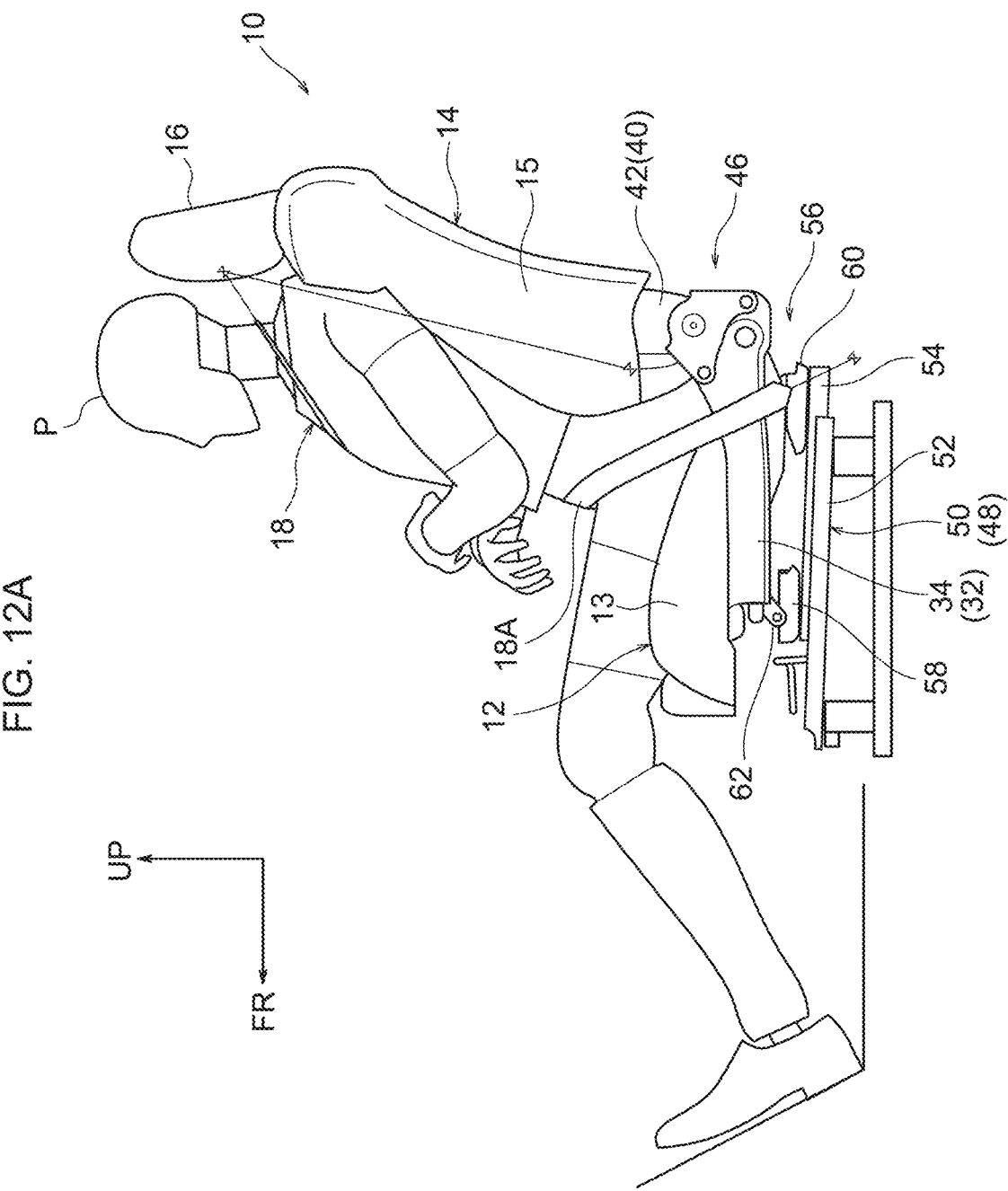
FIG. 12A is a side view illustrating a vehicle seat according to an exemplary embodiment, and is a side view illustrating a state prior to a head-on collision.
Figure 12B:
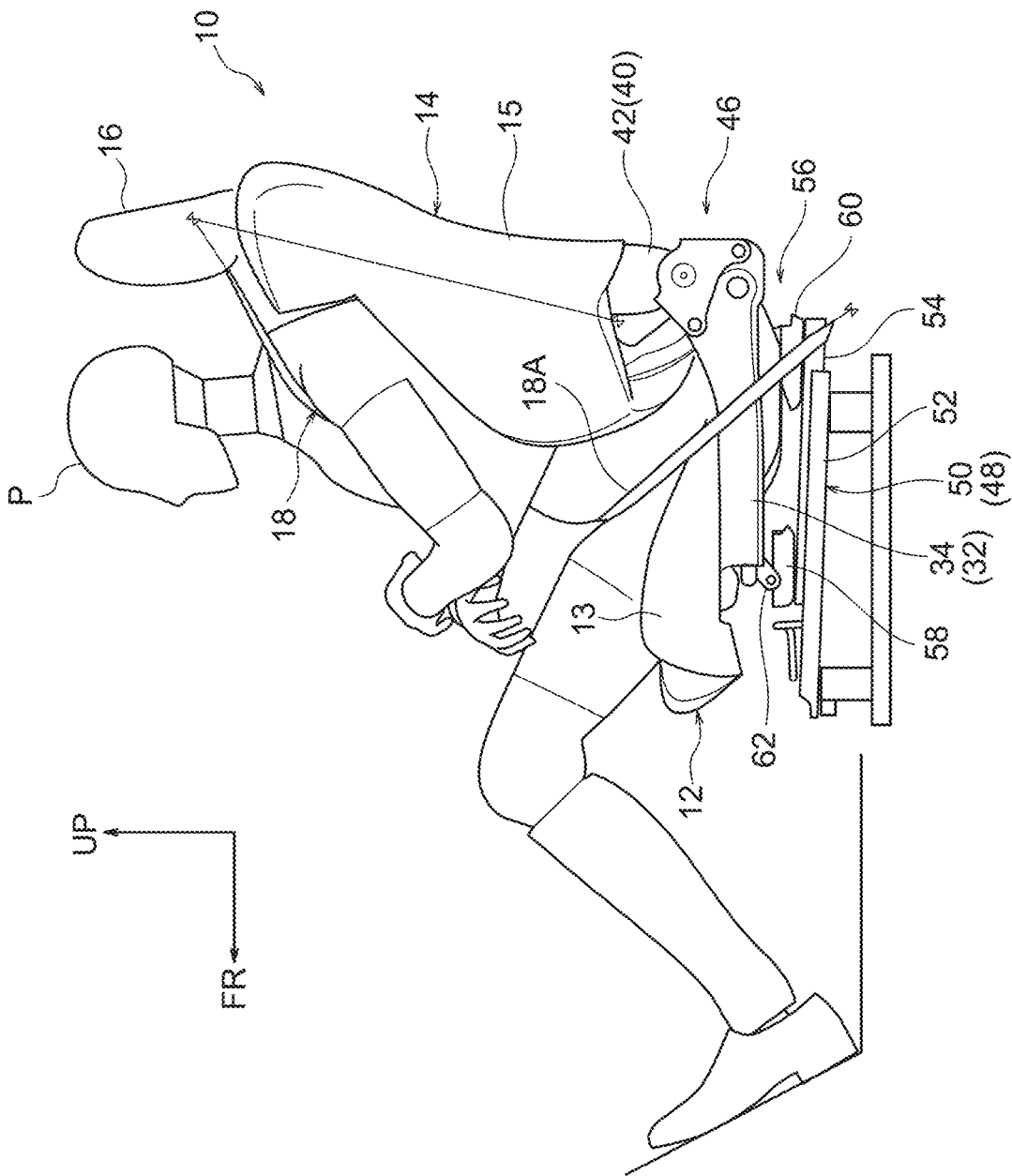
FIG. 12B is a side view corresponding to FIG. 12A and illustrating a state at an initial stage in a head-on collision.

As illustrated in FIG. 12A to FIG. 12C, the vehicle seat 10 according to the present exemplary embodiment includes a seat cushion 12 for an occupant P of a vehicle to sit on, a seatback 14 configuring a backrest to support the back of the occupant P, and a headrest 16 for supporting the head of the occupant P. The front-rear direction, left-right direction (width direction), and up-down direction of the vehicle seat 10 are respectively aligned with the front-rear, left-right, and up-down directions of the vehicle. Note that the occupant P illustrated in FIG. 12A to FIG. 12C is, for example, a fifty percentile America male adult (AM50) HYBRID III dummy for use in head-on collision crash tests. The occupant P wears a three-point seatbelt 18 installed to a non-illustrated vehicle.

The framework of the vehicle seat 10 is configured by a vehicle seat frame 30 as illustrated in FIG. 1 to FIG. 4. The vehicle seat frame 30 includes a seat cushion frame 32 configuring framework of the seat cushion 12, and a seatback frame 40 configuring framework of the seatback 14. Pad members (omitted in the drawings) respectively covered by a cover 13, 15 (see FIG. 12A to FIG. 12C) are attached to the seat cushion frame 32 and the seatback frame 40.

The seat cushion frame 32 includes a left-right pair of side frames 34 disposed at left and right side portions of the seat cushion 12 and extending along the seat front-rear direction, a cushion pan 36 spanning between upper end portions at the front portions of the left and right side frames 34, and a rear frame 38 spanning between rear end portions of the left and right side frames 34. Non-illustrated seat cushion springs are spanned between the cushion pan 36 and the rear frame 38. The pad member of the seat cushion 12 is elastically supported from the seat lower side by these seat cushion springs.

The left and right side frames 34 are, for example, formed in elongated shapes from press formed sheet metal, and are disposed at an orientation such that their length directions are along the seat front-rear direction, and their thickness directions are along the seat left-right direction. The cushion pan 36 is, for example, formed in a substantially rectangular shape from sheet metal, and is disposed at an orientation such that its thickness direction is along the seat up-down direction, and the two seat left-right direction ends of the cushion pan 36 are fixed to the respective front portions of the left and right side frames 34 by a method such as welding. The rear frame 38 is, for example, formed from a metal pipe, and is disposed at an orientation such that its axial direction is along the seat left-right direction, with both seat left-right direction ends of the rear frame 38 connected, so as to allow rotation, to rear end portions of the left and right side frames 34 by a method such as crimping.

A lower end portion of the seatback frame 40 is connected to rear end portions of the left and right side frames 34 through a known reclining mechanism 46 so as to enable reclining. The seatback frame 40 includes a left-right pair of side frames 42 disposed at left and right side portions of the seatback 14 and extending in the seat up-down direction, a non-illustrated upper frame spanning between upper end portions of the left and right side frames 42, and a lower frame 44 spanning between lower end portions of the left and right side frames 42. The headrest 16 is connected to the above upper frame.

The left and right side frames 34 of the seat cushion frame 32 are connected to a vehicle floor section through a known slider mechanism 48 and lifter mechanism 56, and are accordingly adjustable in both front-rear direction position and up-down direction position with respect to the vehicle floor section. The slider mechanism 48 is configured including a left-right pair of slide rails 50 disposed below the left and right side frames 34. The slide rails 50 each include a lower rail 52 fixed to the vehicle floor section by, for example, a method such bolt fastening, an upper rail 54 supported by the lower rail 52 so as to be able to slide in the front-rear direction relative thereto, and a non-illustrated lock mechanism to restrict sliding of the upper rail 54 with respect to the lower rail 52. The lower rail 52 and the upper rail 54 are disposed with their long sides along the front-rear direction.

Figure 2:
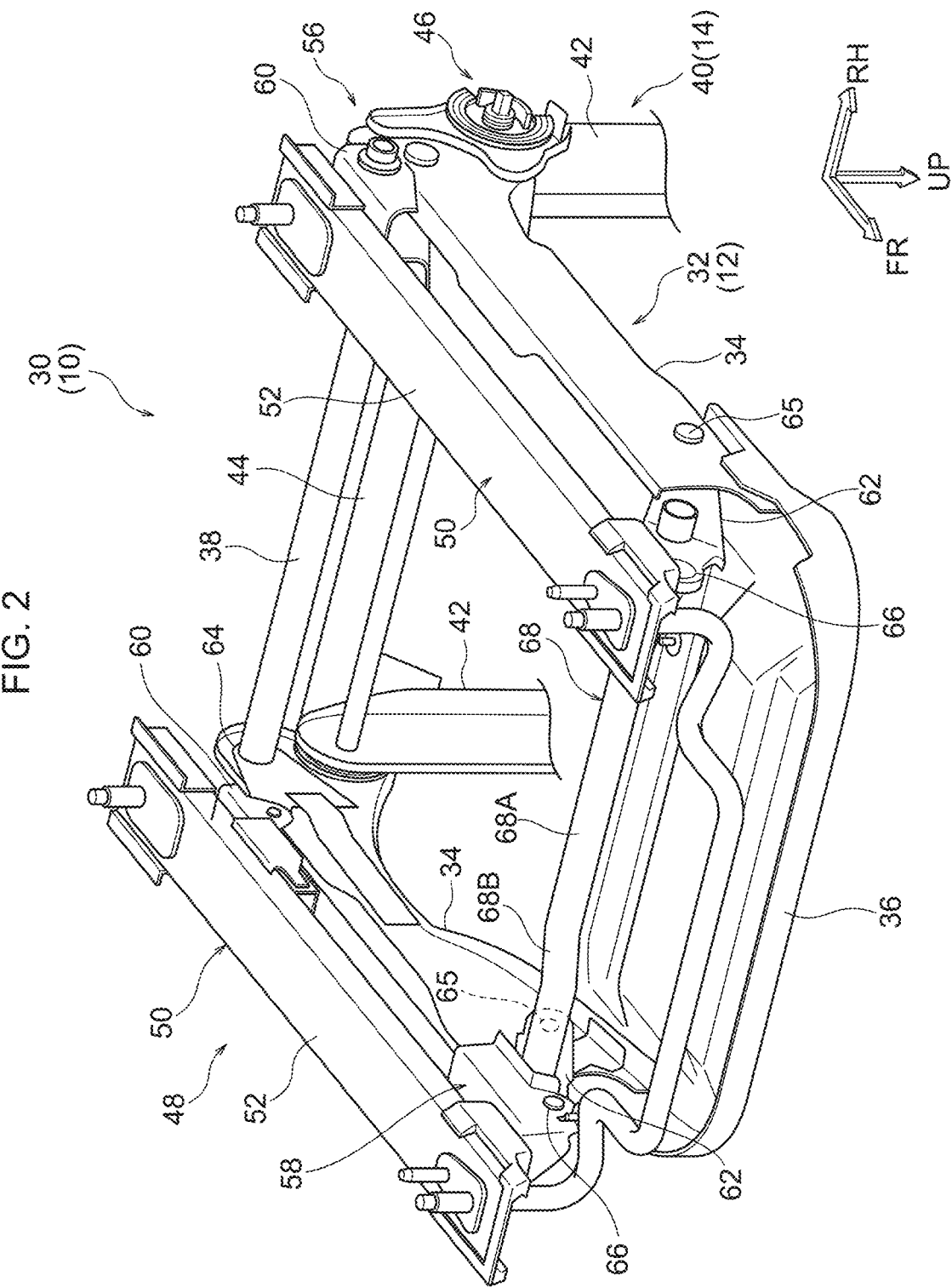
FIG. 2 is a perspective view illustrating a periphery of a seat cushion frame of the same vehicle seat frame, in a state viewed diagonal from a seat right-front side and below.

The lifter mechanism 56 is configured including a left-right pair of front risers 58 (see FIG. 1 to FIG. 4), a left-right pair of rear risers 60 (see FIG. 1 and FIG. 2), a left-right pair of front links 62 (see FIG. 2 to FIG. 4), and a left-right pair of rear links 64 (see FIG. 2; note that the right side rear link 64 is omitted in the drawing). The left and right front risers 58, the left and right rear risers 60, the left and right front links 62, and the left and right rear links 64 are, for example, manufactured from press formed sheet metal. The left and right front risers 58 correspond to "left and right risers" of the present disclosure, and the left and right front links 62 correspond to "left and right links" of the present disclosure.

As illustrated in FIG. 1 to FIG. 4, the left and right front risers 58 each include a front fixed portion 58A fixed to an upper face of front end portions of the left and right upper rails 54 by a method such as bolt fastening, and a front vertical wall 58B extending upward from left-right direction inside ends of the front fixed portion 58A. Although omitted from the drawings, the left and right rear risers 60 include rear fixed portions fixed to an upper face of rear end portions of the left and right upper rails 54 by a method such as bolt fastening and rear vertical walls extending upward from left-right direction one end portions of the rear fixed portions.

The left and right front links 62 and the left and right rear links 64 are disposed at orientations tilting toward the rear side. Each of one end portions (each upper end portion) of the left and right front links 62 is superimposed on a front portion of the left and right side frames 34 from the left-right direction inside, and is connected to the front portion of the left and right side frames 34 so as to be capable of rotating with respect thereto through a connection shaft 65 having an axial direction along the left-right direction. Each other end portion (each lower end portion) of the left and right front links 62 is superimposed on a front vertical wall 58B of the left and right front risers 58 from the left-right direction outside, and connected to the front vertical wall 58B so as to be capable of rotating with respect thereto through a connection shaft 66 having an axial direction along the left-right direction.

Each one end portion (each upper end portion) of the left and right rear links 64 is disposed at the left-right direction inside with respect to the rear portion of the left and right side frames 34, and is fixed to the rear frame 38. The left and right rear links 64 are accordingly connected to the left and right side frames 34 so as to be capable of rotating with respect thereto through the rear frame 38. Each other end portion (each lower end portion) of the left and right rear links 64 is superimposed on a rear vertical wall of the left and right rear risers 60 from one left-right direction side, and connected to the rear vertical wall so as to be capable of rotating with respect thereto through a connection shaft (omitted in the drawings) having an axial direction along the left-right direction.

A sector gear is, for example, formed to one of the left and right rear links 64, and this rear link 64 is rotated by a non-illustrated pinion meshed with this sector gear being rotated manually or electrically. A configuration is accordingly achieved in which the left and right rear links 64 and the left and right front links 62 are rotated thereby, and the up-down direction position of the seat cushion frame 32 (namely, the seat cushion 12) is changed.

The left and right front links 62 are connected together in the left-right direction by a connection pipe 68 serving as a connection member. The connection pipe 68 is configured from, for example, a metal pipe member, and is disposed with its axial direction along the left-right direction. The two left-right direction end portions of the connection pipe 68 are inserted into through holes (omitted in the drawings) formed through intermediate portions of the left and right front links 62, and are fixed to the left and right front links 62 by a method such as welding.

Figure 5:
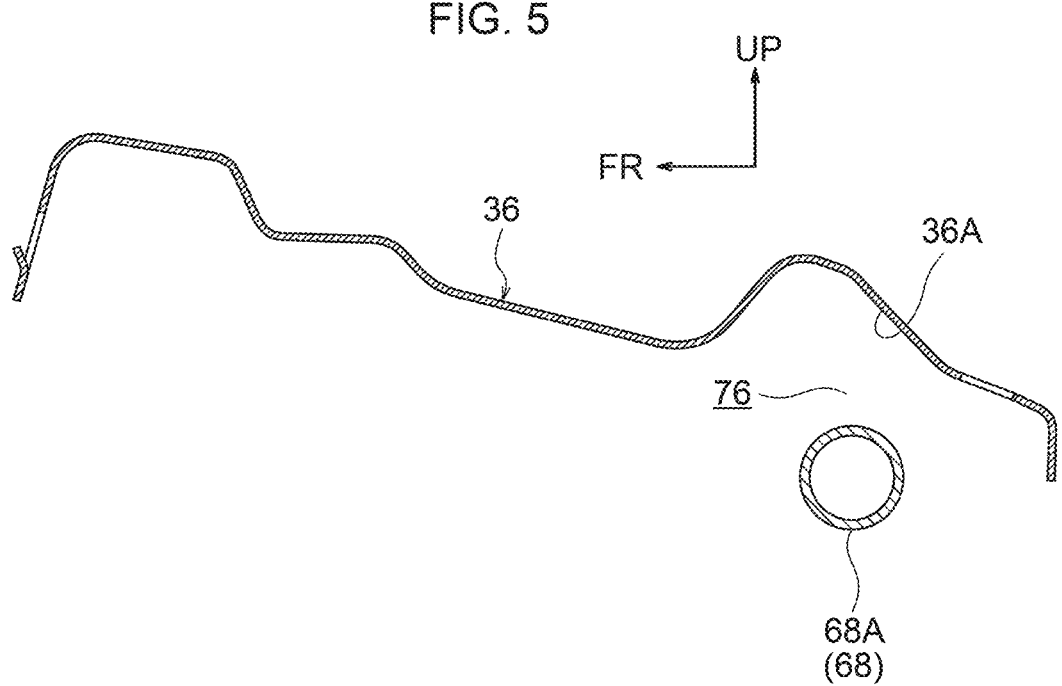
FIG. 5 is a cross-section illustrating a section taken along line F5-F5 of FIG. 1.
Figure 6:
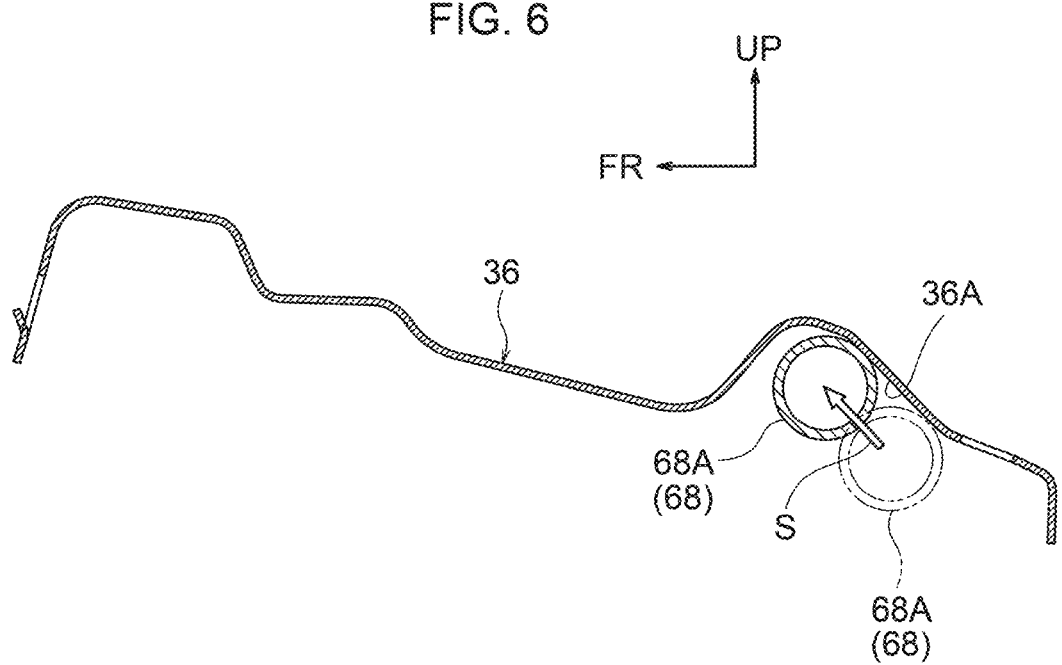
FIG. 6 is a cross-section corresponding to FIG. 5 and illustrating a state of sliding movement between a sloped surface of a cushion pan and a connection pipe during deformation of the cushion pan.

As illustrated in FIG. 5, the above connection pipe 68 is disposed below a rear portion of the cushion pan 36. A sloped surface 36A sloped with a downward gradient toward the rear side is formed at a lower surface of the rear portion of the cushion pan 36. This sloped surface 36A is formed, as an example, in a straight line shape as viewed along the left-right direction. This sloped surface 36A normally opposes the connection pipe 68 from an upper side thereof and is normally separated therefrom by a gap 76. As stated above, the connection pipe 68 rotates together with the right front links 62 as the up-down position of the seat cushion 12 is changed (adjusted) by the lifter mechanism 56, in a configuration such that the gap 76 is secured irrespective of the rotation position of the connection pipe 68.

However, during a vehicle head-on collision, the cushion pan 36 is deformed downward by excessive load in a forward and diagonally downward direction being imparted to the seat cushion 12 from the buttocks of the occupant P wearing the three-point seatbelt 18 (see FIG. 12A to FIG. 12C). A lower portion side of the sloped surface 36A thereby abuts the connection pipe 68. A configuration is adopted such that when the cushion pan 36 attempts to deform further downward from such a state, the sloped surface 36A slides rearward and diagonally downward relative to the connection pipe 68 (see arrow S of FIG. 6).

The head-on collision referred to above is, for example, a collision similar to a full frontal rigid barrier impact test (at a speed of 35 mph (approximately 56 km/h)) as defined by the US National Highway Traffic Safety Administration (NHTSA). A comparatively low load from the occupant P is imparted to the seat cushion 12 at an initial stage of the head-on collision (see FIG. 12B), and a comparatively high load from the occupant P is imparted to the seat cushion 12 at a later stage of the head-on collision (see FIG. 12C). The strength of the cushion pan 36 is set such that the cushion pan 36 deforms downward at the later stage of the head-on collision.

Figure 3:
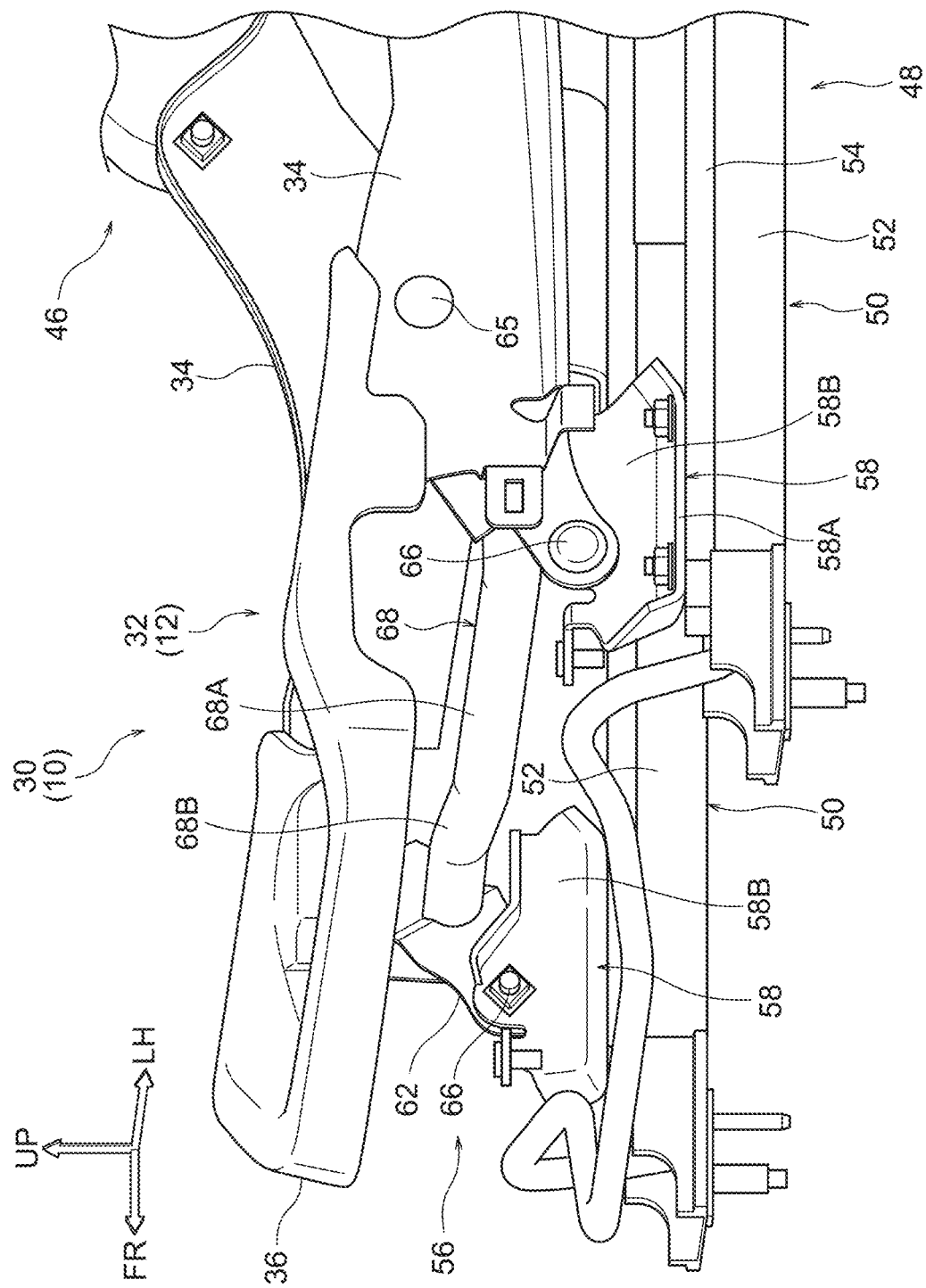
FIG. 3 is a perspective view illustrating a periphery of a front portion of a seat cushion frame of the same vehicle seat frame, in a state viewed diagonal from a seat left-front side.
Figure 4:
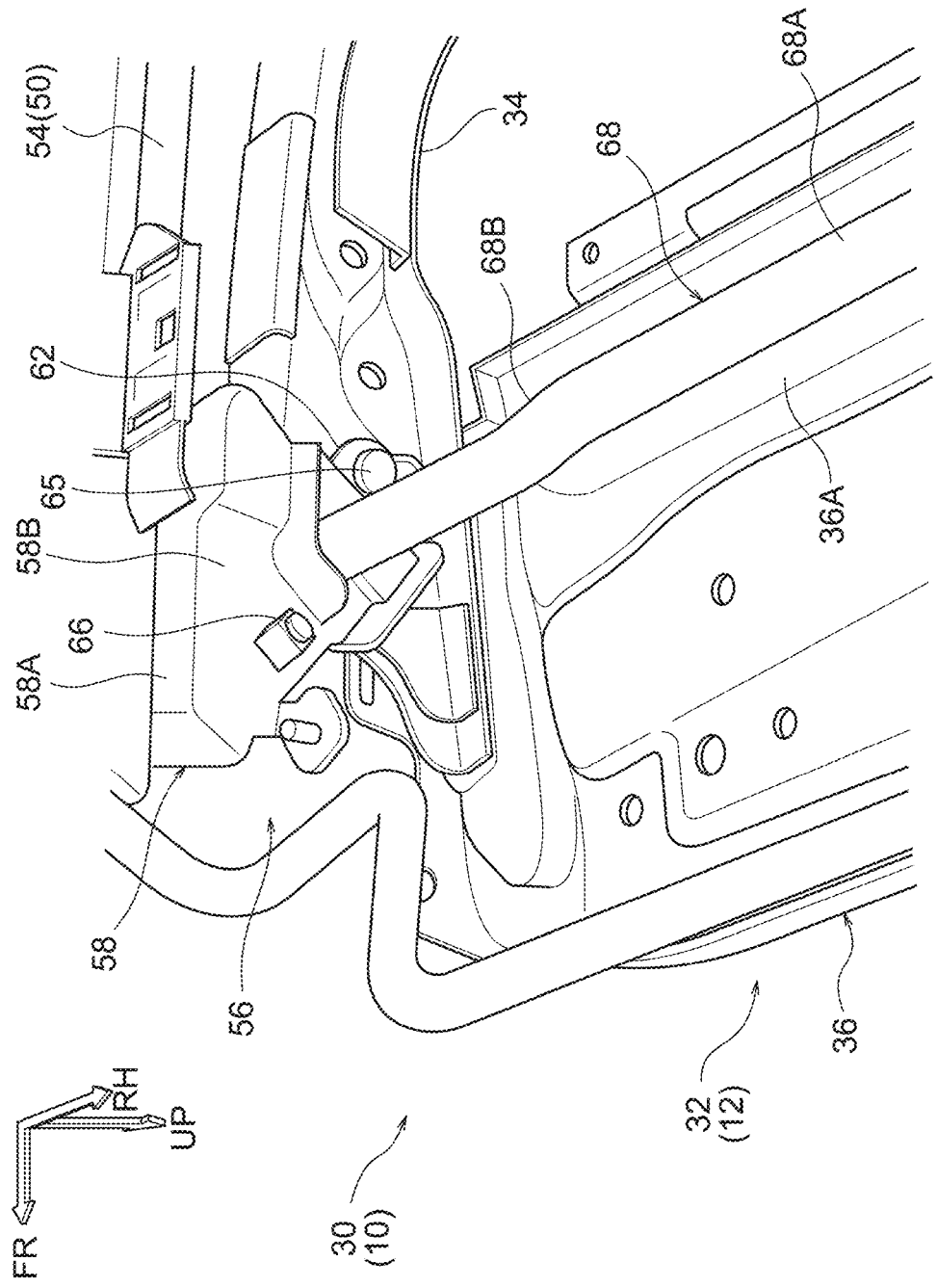
FIG. 4 is a perspective view illustrating a periphery of a left side front portion of a seat cushion frame of the same vehicle seat frame, in a state viewed from a seat lower side.

The relative position of the sloped surface 36A with respect to the connection pipe 68 is set such that the sloped surface 36A slides rearward and diagonally downward relative to the connection pipe 68 under deformation of the cushion pan 36. As illustrated in FIG. 2 to FIG. 4, in the present exemplary embodiment, as an example the connection pipe 68 is bent into a substantially crank shape at respective left and right bent portions 68B provided at the left-right direction two sides of the connection pipe 68. The position of a left-right direction center portion 68A of the connection pipe 68 with respect to the sloped surface 36A is adjusted by such bending, achieving a configuration in which the left-right direction center portion 68A of the connection pipe 68 slides along the sloped surface 36A during a head-on collision.

Figure 7:
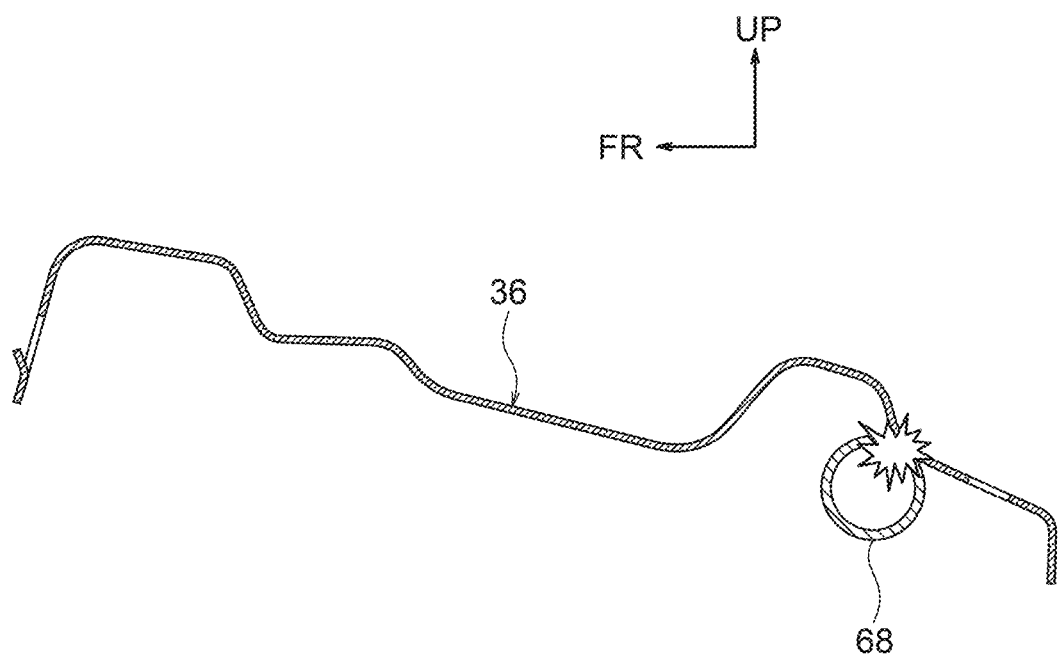
FIG. 7 is a cross-section illustrating an impact state of a cushion pan against a connection pipe during deformation of a cushion pan in a comparative example.
Figure 8:
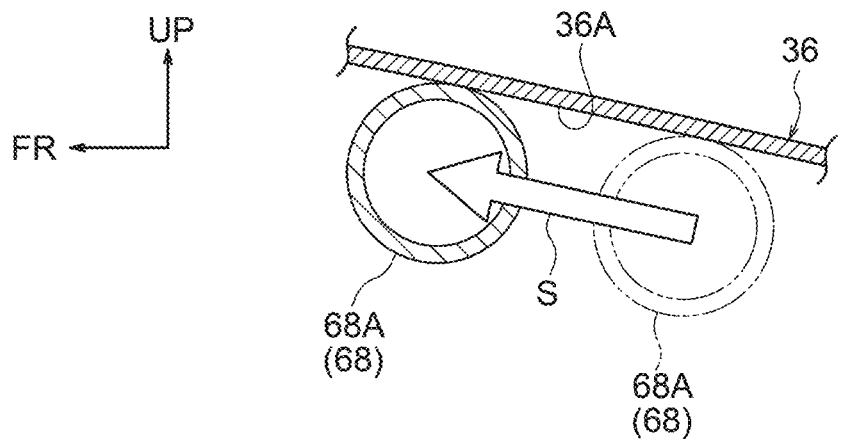
FIG. 8 is a cross-section illustrating a first modified example of a sloped surface of a cushion pan.

Note that a comparative example illustrated in FIG. 7 differs from the present exemplary embodiment in the relative positional relationship between the sloped surface 36A formed to the rear portion of the cushion pan 36 with respect to the connection pipe 68, and also in the size of the sloped surface 36A. In the comparative example, even though the cushion pan 36 deforms and impacts the connection pipe 68 during a head-on collision, there is no relative sliding between the two components, and so reaction force imparted from the cushion pan 36 to the buttocks of the occupant P is increased. In this modified example, the connection pipe 68 is sometimes deformed (fold-bent) by the load from the occupant P. In contrast thereto, in the present exemplary embodiment, the reaction force from the cushion pan 36 imparted to the buttocks of the occupant P is suppressed from increasing by the sliding movement between the sloped surface 36A and the connection pipe 68, a configuration such that fold-bending of the connection pipe 68 is prevented.

Figure 9:
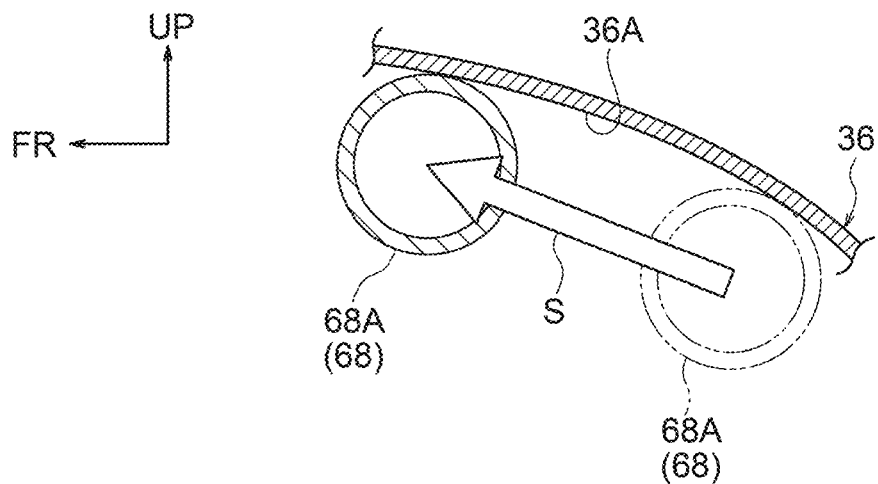
FIG. 9 is a cross-section illustrating a second modified example of a sloped surface of a cushion pan.
Figure 10:
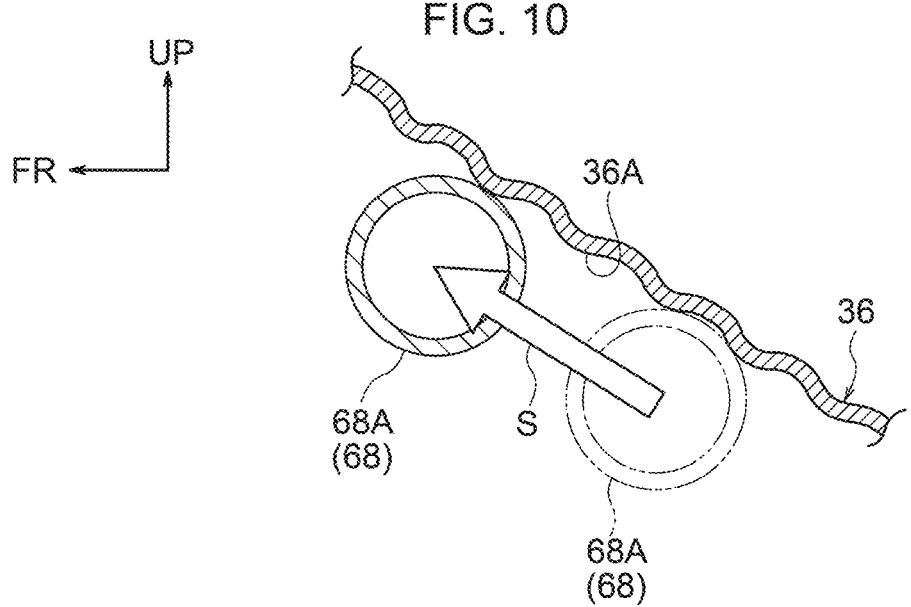
FIG. 10 is a cross-section illustrating a third modified example of a sloped surface of a cushion pan.

Note that the sloped surface 36A illustrated in FIG. 5 is merely an example thereof, and the configuration of the sloped surface 36A may be modified as appropriate. For example, in a first modified example illustrated in FIG. 8, the slope angle of the sloped surface 36A is set smaller than that of the present exemplary embodiment. Thus characteristics such as the reaction force from the cushion pan 36 imparted to the buttocks of the occupant P can be adjusted by changing the slope angle of the sloped surface 36A in this manner. Moreover, for example, in the second modified example as illustrated in FIG. 9, the sloped surface 36A is formed in a curved line shape so as to be convex on the upper side thereof when viewed along the left-right direction. In this second modified example, the reaction force received from the connection pipe 68 when the sloped surface 36A slides along the connection pipe 68 can be caused to change according to the relative position of the sloped surface 36A with respect to the connection pipe 68. Moreover, for example, in a third modified example illustrated in FIG. 10, the sloped surface 36A is formed in a wavy shape as viewed along the left-right direction. The pitch of the wavy shape is set smaller than the diameter of the connection pipe 68. In the third modified example, the frictional resistance when the sloped surface 36A slides along the connection pipe 68 can be adjusted using the wavy shape described above.

Figure 11:
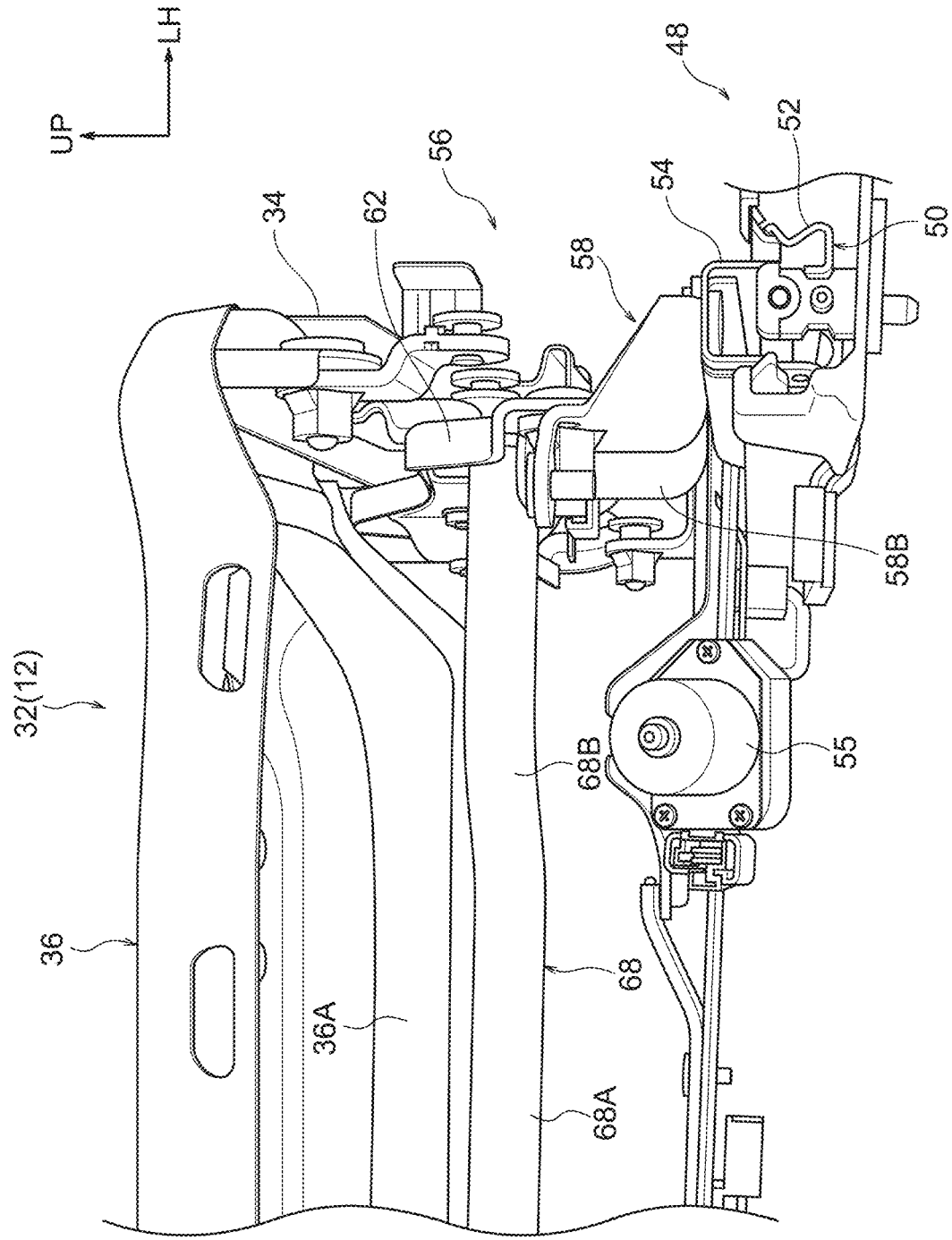
FIG. 11 is a front view illustrating a periphery of a left side portion of a front portion of a seat cushion frame in a modified example of a vehicle seat frame according to an exemplary embodiment as viewed from the seat front side, and illustrates an example in which a slide mechanism includes a motor.

Moreover, although a manual type of the slider mechanism 48 is illustrated in the example of FIG. 1 to FIG. 4, in a cases in which the slider mechanism 48 includes a motor 55, as in the modified example illustrated in FIG. 11, sometimes this motor 55 is disposed below the connection pipe 68. In such cases, for example, disposing one out of the left and right bent portions 68B of the connection pipe 68 (the left bent portion 68B in the example illustrated in FIG. 11) above the motor 55 enables interference between the connection pipe 68 and the motor 55 to be avoided. As a result thereof, a need to change the relationship between the position for fixing the connection pipe 68 to the front links 62 and the motor 55 is eliminated.

Operation and Advantageous Effects

Next, description follows regarding operation and advantageous effects of the present exemplary embodiment.

In the vehicle seat 10 configured as described above, the vehicle seat frame 30 includes the seat cushion frame 32, the left and right slide rails 50, the left and right front risers 58, the left and right front links 62, and the connection pipe 68. The seat cushion frame 32 of the seat cushion 12 configures the framework of the seat cushion 12 for the occupant P of a vehicle to sit on, and includes the left and right side frames 34 disposed at the left and right side portions of the seat cushion 12, and the cushion pan 36 connecting upper end portions of the front portions of the left and right side frames 34 together in the left-right direction. The left and right slide rails 50 are disposed below the left and right side frames 34 and are attached to the floor section of the vehicle.

The left and right front risers 58 are attached to an upper rail 54 of the left and right slide rails 50. The respective one end portions of the left and right front links 62 are connected to the front portions of the left and right side frames 34, and the respective other end portions thereof are connected to the left and right front risers 58. The connection pipe 68 connects the left and right front links 62 together in the left-right direction, and is disposed below the rear portion of the cushion pan 36. The sloped surface 36A sloped at a downward gradient toward the rear side is formed at the lower surface of the rear portion of the cushion pan 36.

Due to the load from the buttocks of the occupant P wearing the three-point seatbelt 18 imparted to the cushion pan 36 being low in an initial stage of a head-on collision (see FIG. 12B), a submarining phenomenon can be suppressed from occurring by the reaction force from the cushion pan 36 imparted to the buttocks of the occupant. At a latter half of the head-on collision (see FIG. 12C), the cushion pan 36 is deformed downward by the increase in load from the buttocks of the occupant P imparted to the cushion pan 36. When this occurs, the sloped surface 36A of the cushion pan 36 slides in the seat rearward and diagonally downward direction relative to the connection pipe 68. The reaction force from the connection pipe 68 imparted to the cushion pan 36 is accordingly suppressed from increasing, enabling a shock absorption ability to be secured by allowing deformation of the cushion pan 36. As a result thereof an injury severity score of the occupant P can be reduced.

Moreover, due to there being no need to set a convex shape for the connection pipe 68, as is the case in the related art described in the BACKGROUND section above, the connection pipe 68 can be prevented from undergoing fold-bending on receipt of load from the occupant P. As a result this enables a reduction to be achieved in the amount of deformation of the frame overall. Moreover, after the connection pipe 68 has impacted against the lower surface of the cushion pan 36 at the upper end of the sloped surface 36A, further deformation of the cushion pan 36 is suppressed, enabling forward movement of the pelvic region of the occupant P to be restricted.

Moreover, in the present exemplary embodiment, a deformation stroke (shock absorption stroke) of the cushion pan 36 can still be secured by sliding movement between the sloped surface 36A and the connection pipe 68 even in a configuration in which the connection pipe 68 of the lifter mechanism 56 is disposed below the rear portion of the cushion pan 36. Thus due to shock being absorbed in the space above the connection pipe 68, this renders the present disclosure applicable to vehicles in which it is difficult to secure a shock absorption space below the connection pipe 68.

Furthermore, in the present exemplary embodiment the connection pipe 68 is bent at the left and right bent portions 68B provided at the left-right direction two sides of the connection pipe 68, and the left-right direction center portion 68A slides along the sloped surface 36A. This accordingly enables the relative position of the center portion 68A of the connection pipe 68 with respect to the sloped surface 36A of the cushion pan 36 to be adjusted by changing the amount of bend set at the left and right bent portions 68B of the connection pipe 68. This, for example, increases the degrees of freedom for placement of the cushion pan 36 and the connection pipe 68.

Note that although the above exemplary embodiment is a configuration in which the left and right bent portions 68B are formed at the left-right direction two sides of the connection pipe 68, there is no limitation thereto, and the connection pipe 68 may be configured by forming in a straight shape.

Moreover, although in the above exemplary embodiment the connection pipe 68 serving as the connection member is configured manufacture from a metal pipe, there is no limitation thereto, and the material of the connection member may be modified as appropriate.

Various other modifications may also be implemented in the present disclosure within a range not departing from the spirit of the present disclosure. Obviously the scope of rights of the present disclosure is not limited by the above exemplary embodiments.

What is claimed is:

1. A vehicle seat frame comprising:
a seat cushion frame configuring a framework of a seat cushion for an occupant of a vehicle to sit on, and including left and right side frames disposed at left and right side portions of the seat cushion, and a cushion pan connecting upper end portions of front portions of the left and right side frames together in a seat left-right direction;
left and right slide rails disposed below the left and right side frames and attached to a floor section of the vehicle;
left and right risers attached to the left and right slide rails;
left and right links having respective one end portions connected to the front portions of the left and right side frames and respective other end portions connected to the left and right risers; and
a connection member that connects the left and right links together in the seat left-right direction and that is disposed below a rear portion of the cushion pan, wherein:
a sloped surface, which is sloped with a downward gradient toward a seat rear side, is formed at a lower surface of the rear portion of the cushion pan; and
the sloped surface slides in a seat rearward and diagonally downward direction relative to the connection member due to the cushion pan deforming in a seat downward direction under a load from the occupant during a head-on collision of the vehicle.

2. The vehicle seat frame of claim 1, wherein the connection member is bent at left and right bent portions provided at seat left-right direction sides of the connection member, and a seat left-right direction center portion of the connection member slides along the sloped surface.

3. The vehicle seat frame of claim 1, wherein the sloped surface is straight as viewed along the seat left-right direction.

4. The vehicle seat frame of claim 1, wherein the sloped surface is curved as viewed along the seat left-right direction.

5. A vehicle seat comprising:
a seat cushion for an occupant to sit on;
a seatback configuring a backrest to support a back of the occupant; and
a framework comprising the vehicle seat frame of claim 1.

* * * * *